219-121 SR
MTR04 OR 3,610,874

(1)

[11] 3,610,874

[72] Inventor Francis Patrick Gagliano
Mountainside, N.J.
[21] Appl. No. 878,634
[22] Filed Nov. 21, 1969
[45] Patented Oct. 5, 1971
[73] Assignee Western Electric Company, Incorporated
New York, N.Y.

[54] LASER WELDING TECHNIQUE
5 Claims, 2 Drawing Figs.

[52] U.S. Cl. ........ 219/121 L
[51] Int. Cl. ........ B23k 9/00
[50] Field of Search ........ 219/121 L, 121 EB

[56] References Cited
UNITED STATES PATENTS
3,402,460 9/1968 Smith ........ 29/589
3,304,403 2/1967 Harper ........ 219/121

*Primary Examiner*—J. V. Truhe
*Assistant Examiner*—Lawrence A. Rouse
*Attorneys*—W. M. Kain, R. P. Miller and R. C. Winter

ABSTRACT: In bonding a conductive metal tab to a fusible fine gauge metal wire of a strip potentiometer, a beam of radiant energy such as a laser beam is applied onto a surface of the tab adjacent a region of contact between the wire and the tab. The tab is tilted so that the tab surface forms an acute angle of between 30° to 50° with respect to the laser beam, and the wire and the tab are so positioned with respect to each other that a portion of the tab immediately adjacent to the wire is rendered molten by the laser beam and flows to the region of contact between the tab and the wire and over the wire by force of gravity, and effect a strong fusion bond between the wire and the tab without melting an entire cross section of the wire.

INVENTOR
F. P. GAGLIANO
By W. L. Williamson
ATTORNEY

LASER WELDING TECHNIQUE

BACKGROUND OF THE INVENTION

1. Field of the Invention

This invention relates to a method of bonding together two or more elements by means of a beam of radiant energy, and more particularly, a method of bonding together two or more elements by means of a laser beam.

2. Description of the Prior Art

According to the prior art, a soldering method was used in bonding a metal tab to a fine gauge conductor wire about 2 to 8 mils in diameter of a potentiometer where the wire constituted the resistance element and the tabs formed a plurality of taps for the potentiometer at various positions along the wire. The soldering method required the usual preliminary steps of cleaning and preparing the surface to be soldered, for example, the removal of insulation from portions of an enameled wire of the potentiometer and cleaning the exposed wire. A tab was then inserted under the exposed portion of the conductor, and molten solder and flux were applied onto the exposed portion of wire and the tab. When the solder was cooled sufficiently the tab was jiggled to check whether or not it was bonded onto the wire properly.

In this method, however, the molten solder tended to overflow onto the adjoining wire segments and melt insulation and establish unwanted electrical shorts between the tab and the adjoining wire segments. In an effort to avoid this, an insulator strip was placed under the tab. Moreover, notwithstanding these laborious steps, it was found that a significant percentage of potentiometers so made were found defective because of either electrical shorts between the windings of the wire and the tab or because of the wire breaking open during the process of soldering and jiggling the wire. Furthermore, the wires used for the windings of the potentiometer which is under some residual tension tended to spring open when part of it melted under soldering heat, and this tendency was difficult to overcome because of the difficulty in preventing a substantial amount of thermal energy of the molten solder from reaching and melting the wire.

SUMMARY OF THE INVENTION

It is an object of this invention to provide a method of bonding elements together using a beam of radiant energy.

It is another object of this invention to provide a method of bonding elements together that overcomes the aforementioned shortcomings and problems in the prior art.

It is a further object of this invention to provide an improved method of laser bonding.

With these and other objects in view this invention contemplates a method of bonding a first element to a second element and includes the steps of (1) applying a beam of radiant energy onto a surface of the second element adjacent a region of contact between the second element and the first element to form a molten portion of the first element, and (2) flowing the molten portion into engagement with the first element in the region of the contact to effect a bond between the two elements.

In accordance with an aspect of the invention, in bonding a conductive metal tab and a metal conductor wire together, a laser beam is focused onto the surface of the tab preferably close enough to the wire so that a fringe of the laser beam is incident upon and heats a portion of the wire. As a consequence, the high-intensity heat from the fringe of the laser beam and the heat from the molten portion of the tab coming in contact with a portion of the wire cause a minor portion of the wire to melt and fuse with the molten portion of the tab and effect a fusion bond between the tab and the wire.

BRIEF DESCRIPTION OF THE DRAWINGS

The above and other objects and features of the present invention may be more fully understood from the following detailed description, taken in conjunction with the accompanying drawings in which.

DETAILED DESCRIPTION

Figure 1:
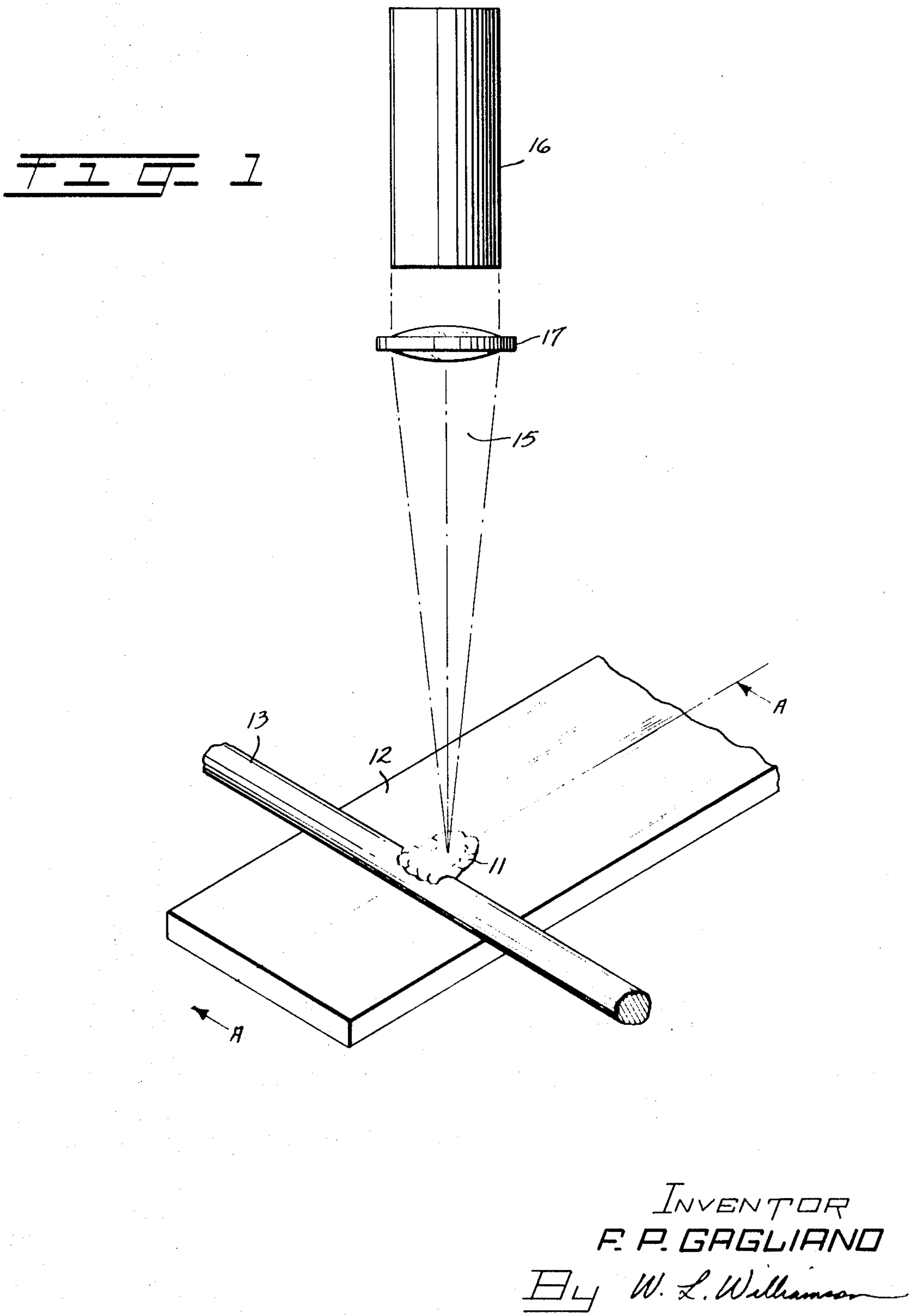
FIG. 1 is a perspective view of a conductor wire bonded to a metal tab by a beam of radiant energy in accordance with a method of the present invention.

In FIG. 1 of the drawings, there is shown a bond indicated as 11 formed between a conductive metal tab 12 and a fragile conductor element 13, which may be a fine gauge wire or a very thin wafer, by means of a laser beam 15. The bond is formed by applying a laser beam 15 to the surface of the tab from a laser source 16. The laser beam may be focused through a lens 17 onto a small predetermined area of the surface adjacent to a region of contact between the tab 12 and the conductor 13 to form a molten portion of the tab. The tab 12 and the fragile conductor element 13 are positioned with respect to each other such that the force of gravity will assist the flow of the molten portion to the region of contact and over the element. When the molten portion cools, a fusion bond is formed between the element and the tab. Advantageously, the laser beam may be focused close enough to the element 13 so that a fringe of the beam is incident upon a portion of the element. As a result, the heat from the fringe of the beam and from the molten portion of the tab 12 that comes in contact with a portion of the element 13 may cause a fringe portion of the wire to melt and fuse with the molten portion of the plate, thereby effecting a fusion bond.

Figure 2:
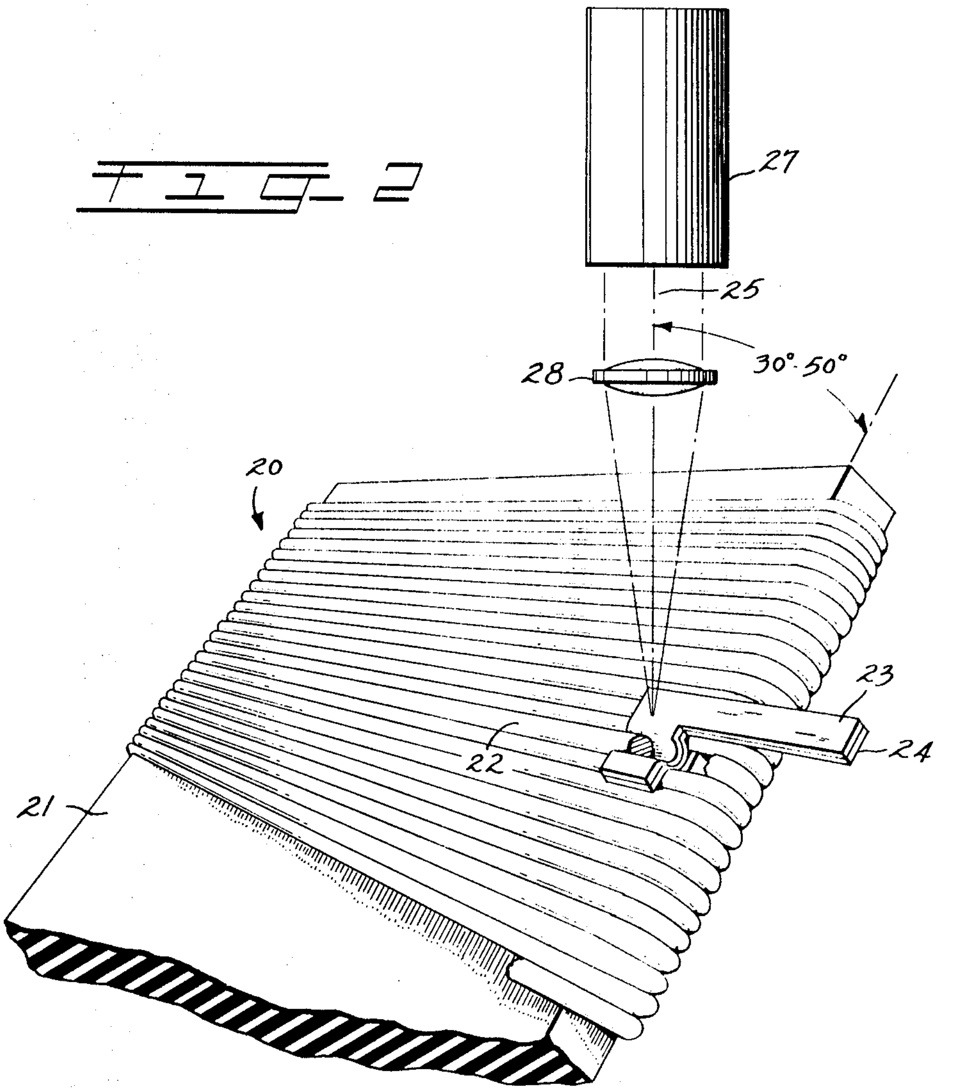
FIG. 2 is a perspective view of a tab bonded to a fine gauge conductor wire in a strip potentiometer by a beam of radiant energy in accordance with a method of the present invention.

The method as outlined above in conjunction with FIG. 1 was successfully applied in bonding metal tabs on the resistance wire of a strip potentiometer such as that shown in FIG. 2. The strip potentiometer 20 comprises a core 21 made of a dielectric material such as a ceramic or a hard rubber material about an eighth of an inch thick and about 4 to 7 feet long, tapered from a width of about half an inch at the ends to a width of about 3 inches at the center. An enameled nichrome wire 22, 2 to 8 mils in diameter, is closely wound around the core to constitute the resistance element of the potentiometer. About 20 tabs 23 of any suitable material such as tinned phosphor bronze, each tab having a suitable insulating material 24 laminated to the bottom thereof, are bonded to the wire at discrete positions along the wire to become tabs for the potentiometer.

Using the method of this invention, a laser beam 25 having a pulse of about 3-millisecond duration and having an energy level of about 8 joules per pulse from a ruby laser source 27 may be advantageously applied to an area of about 20 mils in diameter on the surface of the tabs adjacent a region of contact between the nichrome wire and the phosphor bronze tab. Preferably, the laser beam may be focused close enough to the wire so that a fringe of the beam heats a minor portion of the wire. This is readily done by having the centerline axis of the laser beam fall on the tab surface adjacent the wire by a distance of about the radius of the focused beam such that the fringe of the beam is incident upon a minor portion of the wire.

This resulted in a molten portion of the tab about 22 mils in diameter and about 4 mils in depth. The ruby laser had its characteristic wavelength of 6,943 angstroms. The nichrome wire used had a melting temperature of about 1,400° C. and the phosphor bronze about 1,050° C.

The tab and the wire were positioned so that the axis of the laser beam 25 applied vertically downward formed an angle of between 30° to 50° with respect to the tab surface. The beam was applied at an elevation somewhat higher in elevation than the wire, as shown in FIG. 2 to permit a ready flow of the molten portion of the tab to the region of contact by the force of gravity.

A laser beam cross section area of a predetermined dimension as projected on the surface was obtained by positioning a suitable convergence lens 28 between the laser source and the tab at a distance from the surface somewhat less than the local length of the lens. When the laser beam was focused close enough to the wire so that a fringe of the beam is incident upon a fringe portion of the wire, the heat from the fringe of the beam and molten portion of the tab was enough to melt the fringe portion of the wire. A result was the molten fringe portion of the wire aided in fusion bonding of the tab to the wire.

The method of this invention has many advantages over the prior art soldering method. The extremely high temperature generated by the laser beam and the molten portion of the tab evaporates the enamel insulation of the wire thereby eliminating the need for removing the enamel insulation. By not applying the beam directly on the wire, it was possible to avoid the problem of melting the wire and thereby eliminate altogether the danger that the wire would spring open into two parts as it melts. Moreover, a strong fusion bond between the molten portion of the tab and the molten portion of the wire made it unnecessary to jiggle the wire to check whether the bond was properly made. Furthermore, the present method makes it unnecessary to tin the phosphor bronze tab as was the case with soldering. Also, as the depth of the molten portion of the tab can be very precisely controlled to less than the thickness of the tab, for example, 4 to 6 mils, by controlling the beam energy, it is not essential to provide the tab with the insulating material 24.

In certain materials the extreme high-temperature rise and fall of the element at the region where a laser pulse is applied tends to cause a nonequilibrium type of solidification. In such case, it may be necessary to perform a subsequent step of stress relieving or annealing of the molten and solidified portions in a well-known manner.

The example described above in bonding two or more elements using laser beam are merely an illustration of the present invention. Other changes may be made without departing from the spirit and the scope of this invention.

What is claimed is:

1. A method of bonding a first elongated element to a second element comprising the steps of:
   bringing said first element and said second element into contact with each other,
   directing a beam of radiant energy only onto a surface of said second element at a horizontally displaced region of contact between said first element and said second element to form a molten portion of said second element, and
   causing a flow of the molten portion into engagement with said first element in the region of contact to effect wetting and a bond therebetween without severing said first element.

2. A method as recited in claim 1, wherein said beam of radiant energy is a laser beam;
   said laser beam being focused to a spot of predetermined size by interposing a convergence lens between the laser source and said tab.

3. A method as recited in claim 1 wherein said wire is coated with enamel insulation; the heat from said laser beam causing the evaporation of said insulation at said region of contact to thereby facilitate formation of said bond.

4. A method according to claim 1, wherein said second element is oriented with respect to said first element to cause said flow of the molten portion of said second element into engagement with said first element in the region of the contact by force of gravity.

5. A method for bonding a conductive metal tab to a fusible fine gauge metal conductor wire comprising the steps of:
   bringing said wire and said tab into contact with each other,
   directing a beam of radiant energy only onto a surface of said tab at a horizontally displaced region of contact between said tab and said wire to form a molten portion of said tab, and
   causing a flow of the molten portion of said tab to said wire to effect a fusion bond between said tab and said wire, without breaking said wire.